United States Patent [19]

Takaya et al.

[11] Patent Number: 5,996,278
[45] Date of Patent: Dec. 7, 1999

[54] METHOD FOR FIXING SOIL FOR ORANMENTAL PLANTS

[75] Inventors: Yoshiaki Takaya; Hidemitsu Uchisawa; Hajime Matsue; Kotaro Kobayashi; Minako Kobayashi; Takao Kobayashi; Mioko Kobayashi, all of Aomori, Japan

[73] Assignees: The Aomori Prefectural Government; Koybayashi Hardware Kabushiki Kaisha, both of Aomori, Japan

[21] Appl. No.: 08/525,079

[22] Filed: Sep. 8, 1995

[51] Int. Cl.⁶ .................................................. A01G 7/00

[52] U.S. Cl. .......................................... 47/9; 47/74

[58] Field of Search ................................ 47/74 R, 9 GC, 47/9 P, 58

[56] References Cited

FOREIGN PATENT DOCUMENTS

| 4019446 | 11/1991 | Germany | 47/74 |
| 2249427 | 10/1990 | Japan | 47/74 R |
| 6113682 | 4/1994 | Japan | 47/74 |

*Primary Examiner*—Michael J. Carone
*Assistant Examiner*—Joanne C. Downs
*Attorney, Agent, or Firm*—Sughrue, Mion, Zinn, Macpeak & Seas, PLLC

[57] ABSTRACT

A liquid fixing agent prepared by dissolving in dilute acetic acid chitosan and natural polysaccharide (such as cellulose, pectin, and alginic acid). It is used to fix planted soil (in a terrarium) by application to the surface of soil, followed by drying. Fixed soil prevents ornamental plants from falling or moving in the container during transportation and also remains in place even when the container is inclined.

6 Claims, No Drawings

METHOD FOR FIXING SOIL FOR ORANMENTAL PLANTS

BACKGROUND OF THE INVENTION

1. Field of the Invention

The present invention relates to a method and agent for fixing soil for ornamental plants and also to a terrarium containing fixed soil.

2. Description of the Related Art

Growing ornamental plants, especially those for interior decoration, in a terrarium has a long history in England. A terrarium is often referred to as horticulture in a glass pot, and it is designed such that a variety of ornamental foliage plants are grown on soil in a round transparent container made of glass or the like. A terrarium placed at a corner of the living room reminds one of green of nature. Production of commercial terrariums needs expertise about the selection and planting of adequate plants and the balanced arrangement of plants in the container. In other words, an overall design by expertise is an important factor for commercial success. There cannot exist a terrarium kit consisting of individual components.

The disadvantage of conventional terrariums is that soil in the container is moved by vibration and inclination that occur during transportation. Soil for terrariums is of granular structure (2–3 mm in size), with little adhesion between granules and adhesion to the container wall. Movement of soil disrupts the harmony of plants in the container and hence impairs the commercial value of terrariums. To prevent such troubles, the transportation of terrariums over a long distance needs a great care, and this hinders the diffusion of terrariums. An actual means to cope with this situation is to cover the surface of soil with a piece of corrugated board after planting, thereby fixing soil to the container. In practice, however, it is very difficult to put and remove such fixing materials without moving plants in the container.

OBJECT AND SUMMARY OF THE INVENTION

It is an object of the present invention to provide a method of preventing soil for ornamental plants from being moved by vibration and inclination. It is another object of the present invention to provide a terrarium capable of transportation without damage to the original arrangement of plants.

In order to achieve the above-mentioned object, the present inventors carried out a series of researches which led to the present invention.

The first aspect of the present invention resides in a method for fixing soil for ornamental plants which comprises applying a solution of chitosan and natural polysaccharide to soil, at least partly to the surface thereof, followed by drying.

The second aspect of the present invention resides in an agent for fixing soil for ornamental plants which comprises a solution of chitosan and natural polysaccharide.

The third aspect of the present invention resides in a terrarium in which soil is fixed by said fixing agent applied to soil, at least partly to the surface thereof.

DESCRIPTION OF THE PREFERRED EMBODIMENTS

The natural polysaccharide used in the present invention is exemplified by cellulose, pectin, alginic acid, and polygalacturonic acid.

The present invention is designed such that soil for ornamental plants is fixed by application of a solution of chitosan and natural polysaccharide which exhibits adhesive properties. The advantage of natural polysaccharide is a very low toxicity to plants by contrast to synthetic polymers which are superior in adhesive properties but are not necessarily harmless to plants. Natural polysaccharide, such as starch and cellulose, are superior in adhesive properties; however, it suffers the disadvantage of being attacked by bacteria or molds with the lapse of time, which impairs the appearance and gives off an offensive odor. This problem was solved in the present invention by the use of chitosan. Chitosan is obtained by deacetylation of chitin which is a principal constituent of the shells of crabs and lobsters. It prevents the proliferation of noxious bacteria and molds. It is expected to be a raw material for biodegradable plastics.

Chitosan itself is subject to decomposition by soil microorganisms which have an enzyme to decompose chitosan. This decomposition, unlike putrefaction, takes place such that chitosan loses its fibrous properties and gives a decomposition product which functions as a fertilizer. Therefore, chitosan produces a desired effect on plants. Despite its good adhesive properties, chitosan is not satisfactory as a fixing agent when used alone.

According to the present invention, chitosan, which is insoluble in water, is dissolved in dilute acetic acid and the solution is incorporated with an adequate amount of cellulose, alginic acid, or pectin. Alternatively, it is also possible to mix chitosan, dilute acetic acid, and cellulose all at once. In this way there is obtained the desired fixing agent in the form of liquid. Incidentally, it is not necessary to use dilute acetic acid if chitosan is mixed with an aqueous solution of polygalacturonic acid, because the former is soluble in the latter. Dilute acetic acid may be replaced by formic acid, propionic acid, citric acid, or lactic acid. The fixing agent may be incorporated with additives according to need.

According to the present invention, chitosan and polysaccharide (such as cellulose) should be mixed in a ratio of 100 pbw to 20–400 pbw, preferably 100 pbw to 20–50 pbw. The mixture in this ratio exhibits good adhesive properties for soil particles, while preventing soil from becoming white after drying. With an increasing amount of polysaccharide, the fixing agent increases in fixing force but makes soil look white after drying.

In the case where pectin is used, it is possible to adjust the amount of acetic acid according to the degree of methyl esterification of pectin. Reducing the amount of acetic acid is desirable for plants.

If the fixing agent is to be prepared from alginic acid, which is commercially available in the form of sodium salt, it is necessary to use the same amount of acetic acid as in the case where cellulose is used as a polysaccharide.

The fixing agent prepared as mentioned above is applied directly to soil or at least to the surface of soil by using a sprayer or any other adequate means. After application, soil is dried. Thus, soil particles in the surface layer are bonded together so that soil is fixed in place. The amount of chitosan should be more than 0.2 g, preferably about 0.4 g, per 100 $cm^2$ of the surface area of soil. It is a desirable practice to repeat application several times according to the dryness of the soil surface. Although the number of repetitions varies depending on the viscosity of solution and the kind of soil, it will suffice to repeat application twice or three times, with each application followed by drying. There are no specific restrictions on the composition and particles size of the soil to be used.

It was found that terrariums without the above-mentioned treatment became heavily damaged after transportation for 12 hours by truck. Their plants fell down even after transportation for only 1 hour by truck. By contrast, terrariums treated according to the present invention remained intact, with plants standing upright, after transportation under the same conditions as above.

According to the present invention, it is possible to firmly fix soil for ornamental plants, so that terrariums containing fixed soil can be transported without damage to plants and can be inclined without soil being moved.

With soil fixed, ornamental plants in a container withstand long-distance transportation and hence terrariums are easy to handle.

The fixing agent has no adverse effect (such as discoloration) on soil and prevents proliferation of harmful microorganisms owing to the antibacterial action of chitosan. In addition, being biodegradable, chitosan has a desired effect on plants.

The ability to firmly fix soil can be utilized to fix soil inclined (instead of horizontal) so that plants can be viewed laterally (instead of vertically). Because of this characteristic, the present invention can be used when ornamental plants are planted on an inclined retaining wall or when it is necessary to reduce the amount of soil for plants.

Fixing soil inclined is also useful for planters placed outside the window if ornamental plants are allowed to fully grow downward outside the planters for a better view. The inclined soil surface permits plants to grow rapidly as desired.

While certain preferred embodiments have been shown and described, many changes and modifications within the spirit of the invention will be apparent to those of working skill in this technical field. Thus, the scope of the invention should be considered as limited only by the appended claims.

EXAMPLES

The invention will be described in more detail with reference to the following examples.

Example 1

Preparation of Fixing Agent From Cellulose

Commercial chitosan (20 g) was dissolved in 1 liter of 1% acetic acid with stirring at room temperature. The resulting solution was mixed with 125 g of cellulose paste (conditioning 4% cellulose). Thus there was obtained a milky white fixing agent.

Example 2

Preparation of Fixing Agent From Pectin

Commercial chitosan (1 g) and pectin with a degree of methyl esterification of 70% (1 g) were dissolved in 200 ml of 0.5% acetic acid with stirring at room temperature. Thus there was obtained a slightly milky white fixing agent.

Example 3

Preparation of Fixing Agent From Alginic Acid

Commercial chitosan (1 g) and sodium alginate (1 g) were dissolved in 200 ml of 5% acetic acid with stirring at room temperature. Thus there was obtained a viscous fixing agent which is slightly white but nearly colorless and transparent.

Example 4

Fixing of Soil

A spherical glass container, about 35 cm in diameter, was partly charged at its bottom with porous granular soil (2–3 mm in diameter) produced from crystobalite. A variety of ornamental plants were planted in the soil. The surface of the soil was sprayed with the fixing agent obtained in Examples 1 to 3 mentioned above. Spraying was carried out such that the amount of chitosan was 0.2 g for 100 $cm^2$ of surface area. Spraying was followed by drying at room temperature, and the procedure of spraying and drying was repeated twice or three time. In this way the soil in the container was fixed. The resulting products were packed in a corrugated board box and transported from Aomori to Tokyo (about 700 km) by truck. They remained intact, with no soil movement and plant falling. After their return trip, they remained intact. In addition, it was found that the content in the glass container remained in position when the container was inclined about 60 degrees. The fixing agent had no adverse effect on the plants in the container. Once the soil is dried, the soil remained fixed even when it gets soft upon watering.

What is claimed is:

1. A method for fixing soil for ornamental plants in place which comprises applying a solution of chitosan and natural polysaccharide to soil, at least partly to the surface thereof, followed by drying, whereby movement of the soil is prevented.

2. A method for fixing soil as defined in claim 1, wherein the natural polysaccharide is one which is selected from the group consisting of cellulose, pectin, and alginic acid.

3. A method for fixing soil as defined in claim 1, wherein the solution contains an organic acid selected from the group consisting of dilute acetic acid, formic acid, propionic acid, citric acid, and lactic acid.

4. A method for fixing soil as defined in claim 1, wherein the solution contains 100 pbw of chitosan and 20–400 pbw of natural polysaccharide.

5. A method for fixing soil as defined in claim 4, wherein the solution contains 100 pbw of chitosan and 20–50 pbw of natural polysaccharide.

6. A method for fixing soil as defined in claim 1, wherein the natural polysaccharide is polygalacturonic acid.

* * * * *